May 10, 1949.  E. LATSHAW  2,469,925

SPRING

Filed Oct. 17, 1944

INVENTOR
Elmer Latshaw
BY
Robert A. Shields
ATTORNEY

Patented May 10, 1949

2,469,925

UNITED STATES PATENT OFFICE 2,469,925

SPRING

Elmer Latshaw, Philadelphia, Pa., assignor to ACF-Brill Motors Company, New York, N. Y., a corporation of Delaware Application October 17, 1944, Serial No. 559,005

7 Claims. (Cl. 267—47)

This invention relates to springs in general and in particular to leaf springs intended for use with passenger vehicles.

The bulk of springs as previously built have relied more or less on friction between the leaves to dampen vibrations and assist in strengthening the spring. A certain number of springs have been built with friction substantially eliminated by placing inserts between the leaves but it was very hard to retain these spacers. Also in forming the eyes on the leaves it has been customary to roll the metal and then leave the rolled over metal unattached to the leaf or to weld to the leaf. Welding of the rolled over part is none too satisfactory with certain types of spring alloys. As a result, whether the rolled over part was attached or unattached, great difficulty was met with in inserting the bushings without spreading the eye or causing unequal pressure to be exerted on the bushing, resulting in unequal bushing wear. It is an object, therefore, of the present invention to provide a spring having an eye formed by rolling over a part of the leaf metal to provide the eye and an extension underlapping the compression side of the leaf.

A further object of the invention is the provision of a spring having an eye formed by a rolled over portion of the leaf, which rolled over portion also provides an extension underlapping the leaf and forming a combined spacer and wear plate.

A still further object of the invention is the provision of a spring leaf in which the metal is rolled over and bent back on itself to form an eye and extension edge-welded to the body of the leaf to prevent eye distortion.

These and other objects of the invention will be apparent to persons skilled in the art from a study of the following description and accompanying drawings in which Fig. 1 is an elevational view of an improved spring assembly;

Figure 2:
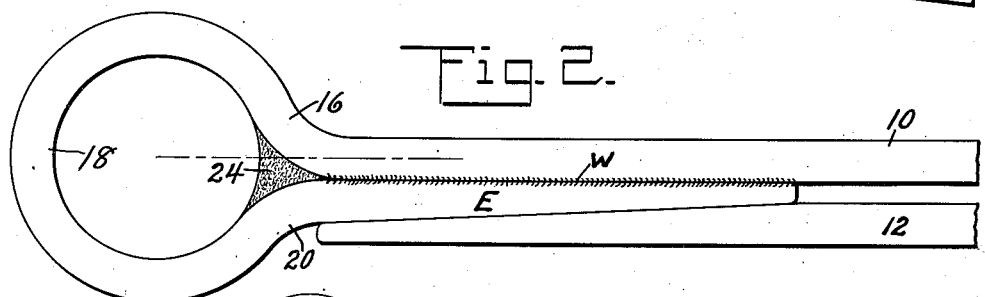
Fig. 2 is an enlarged detail of an end of one of the springs.

Referring now to the drawings in detail it will be seen that the complete spring assembly preferably comprises an upper spring set 2 and a lower spring set 4 rigidly clamped together adjacent their centers by some structure such as axle A. Preferably the springs are pivotally joined together adjacent one end by a rigid shackle R pivoted on the vehicle as at 6 while being pivotally connected to independent jointed shackles J pivotally carried by the vehicle as at 8. The springs as shown are formed by an upper leaf 10 and a lower leaf 12 held in spaced relationship by a spacer 14 adjacent the center and by an extension E at the ends. As shown, most clearly in Fig. 2, the metal of leaf 10 is deflected upwardly as at 16 then rolled back upon itself to form a circular eye 18. As the metal forming eye 18 approaches the under surface of leaf 10 it is given a reverse bend as at 20 and directed toward the center of the spring to provide the extension E. This extension E, as clearly shown, decreases in thickness and increases in width from the eye toward the center of the spring and has its side edges welded to the leaf 10 as at W. In order to strengthen the eye and prevent any spreading tendency, the gap between the rolled portions of the eye is filled by weld metal 24. After forming the eye and securely welding the rolled back parts together, the eye may be reamed thus giving a true cylindrical surface providing full and equal bearing on the bushing (not shown) which will be pressed into the eye for pivotally mounting the spring on the shackles. The leaf 12, as clearly shown in Fig. 2, decreases in thickness and width as it approaches its end and bears directly on the extension E, thus it will be seen that the extension E forms a combined spacer and wear pad preventing leaf 12 from contacting leaf 10. It will also be seen that the pressure between leaf 12 and extension E will relieve the welds W and 24 of considerable strain and prevent any tendency for the eye to open. As clearly shown in Fig. 2 the axis of eye 18 lies substantially in the medial plane of leaf 10 thus giving better spring loading when the spring is subjected to torsion during roll of the vehicle to which the spring is attached.

Figure 1:
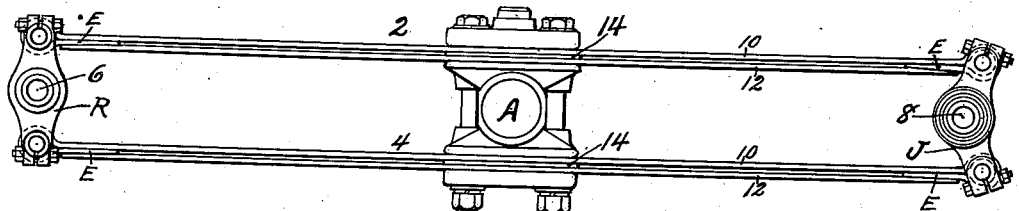
Figure 3:
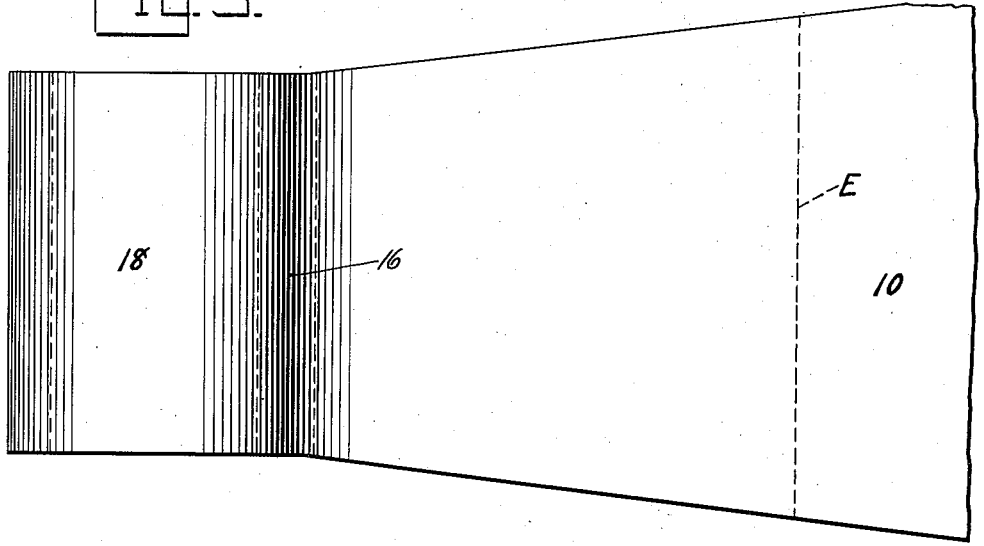
Fig. 3 is a plan view of the spring end.
Figure 4:
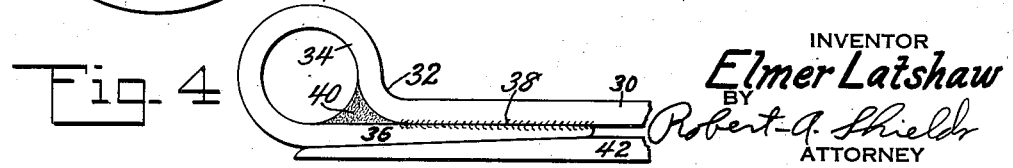
Fig. 4 is an enlarged detail similar to Fig. 2 but showing a slight modification thereof.

In the form shown in Fig. 4 the top leaf 30 is bent quite sharply at 32 then rolled to provide eye 34. In this case the metal of the eye is directed straight back parallel to the under surface of leaf 30 to provide the extension 36. By forming the eye in this manner its axis is offset slightly from the medial plane of the leaf a sufficient amount to bring the eye tangent to the lower surface of leaf 30. Such bending simplifies the eye formation without materially increasing the strain on the leaf when subjected to torsional forces. In this form, like that described in connection with Figs. 2 and 3, the extension 36 conforms to the contour of leaf 30 and its side edges welded thereto as at 38 with the gap between the leaf and extension filled by weld metal 40. In this form the bottom leaf 42 extending beneath extension 36 can be extended so that its end falls substantially beneath the axis of eye 34. In this manner relative movement between leaf 42 and extension 36 is decreased and much better loading is obtained.

It will be clear from the preceding that irrespective of the manner in which the eye is formed, the leaf metal has been bent back upon itself to form the eye and an extension, which extension serves the triple purpose of providing a spacer, a wear plate and a means for preventing opening of the eye. It will also be obvious that various modifications in construction and design may be made without departing from the spirit or scope of the invention which is to be limited only by the appended claims.

What is claimed is:

1. A spring comprising at least two adjacent leaves and having the metal of one leaf bent back upon itself adjacent an end thereof to form an eye with its axis located substantially in the medial plane of the leaf, the bent back metal being given a reverse bend adjacent the closure of the eye forming an extension of the metal of the eye underlapping said leaf and bearing upon the next adjacent leaf, and means immovably securing together said extension and overlapping leaf.

2. A spring comprising at least two adjacent leaves and having the metal of one leaf bent back upon itself adjacent an end thereof to form an eye with its axis located substantially in the medial plane of the leaf, the bent back metal being given a reverse bent adjacent the closure of the eye forming an extension of the metal of the eye underlapping said leaf, and bearing upon the next adjacent leaf, weld metal joining said extension and the one leaf together along the side edges, and weld metal filling the space at the closure of the eye to thereby provide a circular opening.

3. A spring comprising a plurality of adjacent leaves and having the metal of one leaf bent back upon itself adjacent the end thereof to form an eye with its axis offset to one side of the medial plane of the leaf a sufficient amount to place the eye tangent to the plane of the lower surface of the leaf, the bent back metal being extended beneath said one leaf and bearing on an adjacent leaf.

4. A spring comprising at least two leaves and having the metal of one leaf bent back upon itself intermediate its ends to form a pair of spaced eyes and extensions underlapping the leaf, the extensions at each end of the leaf being immovably secured thereto and providing a combined spacer and wear plate between said one leaf and the next adjacent leaf.

5. A spring comprising at least two leaves and having the metal of one leaf bent back upon itself intermediate its ends to form a pair of spaced eyes and extensions underlapping the leaf, the extension at each end of the leaf being immovably secured thereto and providing a combined spacer and wear plate between said one leaf and the next adjacent leaf, said extension conforming in width to said one leaf and tapering in thickness from the eye toward the center of the leaf.

6. In a vehicle spring having a plurality of adjacent leaves unconnected to each other at their ends, one of said leaves having a portion thereof bent back upon itself adjacent one of its ends to form an eye, said bent back portion having a reverse bend adjacent the closure of said eye forming an extension immovably secured to the side of said leaf facing the next adjacent leaf and also bearing upon said next adjacent leaf.

7. In a vehicle spring having a plurality of adjacent leaves unconnected to each other at their ends, one of said leaves having a portion thereof bent back upon itself adjacent one of its ends to form an eye with the axis of said eye located substantially in the medial plane of said leaf, said bent back portion having a reverse bend adjacent the closure of said eye forming an extension immovably secured to the side of said leaf facing the adjacent leaf.

ELMER LATSHAW.

REFERENCES CITED

The following references are of record in the file of this patent:

UNITED STATES PATENTS

| Number | Name | Date |
|---|---|---|
| 1,322,440 | Hill | Nov. 18, 1919 |
| 1,654,447 | Ballot | Dec. 27, 1927 |
| 1,900,841 | Nilsson | Mar. 7, 1933 |
| 2,211,647 | Collier | Aug. 13, 1940 |
| 2,282,716 | Foster | May 12, 1942 |

FOREIGN PATENTS

| Number | Country | Date |
|---|---|---|
| 199,658 | Great Britain | June 28, 1923 |
| 279,889 | Great Britain | Jan. 19, 1928 |
| 461,409 | Germany | June 21, 1928 |
| 508,907 | Great Britain | July 7, 1939 |
| 679,034 | France | Jan. 5, 1930 |